United States Patent
Fischer et al.

Patent Number: 5,677,518
Date of Patent: Oct. 14, 1997

[54] DEVICE FOR DEADENING SOUND IN PIPELINES

[75] Inventors: Andreas Fischer, Dormagen; Susanne Müller, Monheim; Werner Strassen, Ratingen, all of Germany

[73] Assignee: Bayer Aktiengesellschaft, Leverkusen, Germany

[21] Appl. No.: 556,129

[22] Filed: Nov. 13, 1995

[30] Foreign Application Priority Data

Nov. 17, 1994 [DE] Germany ............ 44 40 918.4

[51] Int. Cl.$^6$ .................................... F01N 1/08
[52] U.S. Cl. ............... 181/269; 181/255; 181/256; 181/258; 181/265; 181/272
[58] Field of Search ............. 181/255, 258, 181/265, 267, 269, 272, 240, 256, 233

[56] References Cited

U.S. PATENT DOCUMENTS

| | | |
|---|---|---|
| 1,514,441 | 11/1924 | Culp . |
| 1,665,005 | 4/1928 | Culp ............................... 181/255 |
| 2,043,030 | 4/1936 | Bourne . |
| 2,100,655 | 11/1937 | Bourne . |
| 2,218,959 | 2/1940 | Palmer . |
| 3,498,406 | 3/1970 | Heath ............................... 181/255 |
| 4,022,291 | 5/1977 | Stephenson ........................ 181/255 |
| 4,172,508 | 10/1979 | Moss et al. ........................ 181/265 |

FOREIGN PATENT DOCUMENTS

| | | |
|---|---|---|
| 4243280 | 6/1994 | Germany . |
| 945583 | 7/1982 | Russian Federation . |
| 1564458 | 5/1990 | Russian Federation . |
| 493538 | 1/1937 | United Kingdom . |

*Primary Examiner*—Khanh Dang
*Attorney, Agent, or Firm*—Sprung Kramer Schaefer & Briscoe

[57] ABSTRACT

A device for deadening sound in pipelines comprising a chamber (1) positioned on the pipeline (2, 7) with a discontinuous pipeline section (3) projecting inwards at the chamber inlet and a discontinuous section (7) of the pipeline connected at the chamber outlet. Disposed within the chamber (1) opposite the opening of the pipeline section (3) there is a cover cap (4), in the form of a pipe resonator, whose side wall encloses the pipeline section (3) on one part of its length so that an annular channel (5) remains between the side wall and the pipe section (3). This permits the attainment of a very efficient sound deadening under certain geometric conditions.

11 Claims, 5 Drawing Sheets

DEVICE FOR DEADENING SOUND IN PIPELINES

The invention concerns a device for deadening sound in pipelines, which is based on a resonance sound damper disposed within a chamber. The chamber is built into a sound-conducting pipeline which projects into the chamber with a section of pipeline at the inlet end and is connected at the chamber outlet to an outlet opening in the chamber.

Various types of resonance sound dampers for reducing sound emission are described in the literature (see, for example, H. Schmidt; Schalltechniches Taschenbuch (Acoustic Engineering Handbook); fourth edition, 1989). A special type of resonator is the so-called pipe resonator, whose operation depends on an interference between the incoming sound wave in a pipeline and a reflected sound wave. This reflection occurs in a resonator chamber coupled to the pipeline. In an infinitely long pipeline, sound waves propagate below the limiting frequency of the channel, defined by their geometric transverse dimensions, as a progressive plane wave. If a discontinuity occurs in the channel, e.g. a sudden cross-sectional discontinuity, stub line, etc., then the incident sound wave is partially or wholly reflected as a result of the impedance change. A reduction of sound occurs, such as that which exists e.g. at a wall.

In the case of a conventional pipe resonator, such as that shown in FIG. 1, the transverse dimensions D of the pipe resonator determine the effective frequency range (see, for example, Zeitschrift für Lärmbekämpfung (Sound Abatement Journal), edition 40 (1993), 99 to 102). Above an upper limiting frequency $f_{og}=k*c/l_q$, this type of sound damper is no longer effective. In round pipes, k=0.6 and in rectangular pipes k=0.5, c being the sound velocity and $l_q$ being the greatest transverse dimension (i.e., the chamber diameter in the case of round pipes). Even in the case of very small chamber diameters D, the effect is limited to the low-frequency range only (e.g. in the case of D=300 mm, the upper limiting frequency $f_{og}$=600 Hz). In addition, operation is limited to single frequencies below the upper limiting frequency. Relatively narrow-band damping maxima are to be expected for the resonance frequencies $f_r=\lambda/4$ ($\lambda$=wavelength) and the odd multiples of $\lambda/4$—allowing for the opening correction. There is very little or even no reduction of the sound level in the remaining frequency ranges.

Special pipe resonator designs are described in U.S. Pat. No. 2,043,030 and U.S. Pat. No. 2,075,265, as well as in DE 42 43 280 (=LeA 29302). Even in these designs, however, a reduction of the sound level in the high-frequency range of >1000 Hz is possible only to a limited extent, with small pipeline diameters or with very elaborate fabrication (e.g. the use of dividing plates, or division of the channel into small, single channels).

Although other types of sound dampers, e.g. absorption sound dampers, such as those described in DE 35 09 033, do operate in the high-frequency range, their use is greatly limited primarily in the case of moist or product-loaded media.

Even with the sound damper principle described in the German laid open specification 42 10 786, no satisfactory damping is achieved in the frequency range >1000 Hz.

The object, therefore, was to develop a resonance sound damper whose upper limiting frequency is independent of the dimensions of the pipeline and which at the same time effects significant sound level reductions without the use of absorption material.

Starting from the device for deadening sound in pipelines which is described at the beginning, this object is achieved, according to the invention, in that disposed within the chamber opposite the opening of the section of pipeline there is a cover cap, fashioned as a pipe resonator, whose side wall encloses the section of pipeline concentrically on one part of its length in such a way that an annular channel with the inside width $d_k$ remains between the side wall and the section of pipe, the diameters $D_K$ of the cover cap and d of the section of pipeline, the inside width $d_k$ of the annular channel and the distance $l_{pf}$ between the opening of the section of pipeline and the cower cap being dimensioned in dependence on the upper limiting frequency $f_{og}$ of the sound levels to be deadened so as to simultaneously fulfill the equations.

$$d_k \leq d, \quad d_k \leq l_{pf}, \quad l_{pf} \leq d \qquad \text{a)}$$

and $$D_K = d + 2*d_k/(2*f_{og}). \qquad \text{b)}$$

In the solution according to the invention, the upper limiting frequency $f_{og}$ of the pipe resonator is no longer dependent on the greatest transverse diameter, and therefore on the diameter D of the chamber. Instead, the upper limiting frequency is determined by the diameter d of the pipeline and by the inside width $d_k$ of the annular channel between the circumferential surface of the cap and the section of pipe projecting into the chamber.

It is therefore sufficient if the parameters d or $d_k$ fulfil the two above-mentioned conditions. Particularly good results are achieved if the inside width $d_s$ of the annular gap between the cover cap and the inner wall of the chamber corresponds to the inside width $d_k$ of the annular channel between the cover cap and the section of pipeline. The optimal distance $l_{pf}$ between the cover cap and the opening of the pipe section is dimensioned as in a conventional pipe resonator, taking account of the opening correction. Through appropriate dimensioning and application of the cover cap, therefore, the damping behaviour can be simply adapted to an upper limiting frequency which is predetermined by the sound wave.

A further improvement is achieved if the annular gap between the cover cap and the inner wall of the chamber is formed as an interference damper for the given sound frequency and dimensioned with respect to its length lso as to fulfil the equation $l_1=c/(4*f_r)$, c being the sound velocity and $f_r$ being the given sound frequency of the sound waves which are to be deadened. Preferably, the length $l_1$ of the annular gap is double the distance $l_{pf}$ between the opening of the section of pipeline and the cover cap.

The walls of the cover cap do not need to be solid. They can also consist of perforated plates. The cap surface can also be slightly curved. In this case, the resonance maximum is widened somewhat, this being desirable in many cases.

The sound damper according to the invention is preferably combined with pipe resonators in a known manner. For this purpose, a section of pipeline, projecting into the chamber, is also fitted at the chamber outlet. It is then possible, with appropriate dimensioning, to achieve wideband sound level reduction at low frequencies and also at high frequencies.

It has proved to be particularly advantageous if two sound damper systems according to the invention are connected in series within a chamber, i.e., if a further pipe resonator, dimensioned in the same way, is disposed opposite the opening of the section of pipeline at the chamber outlet, so that the chamber has two successive pipe resonators connected in series.

It is also possible, through a preferred combination with absorption sound dampers, to achieve a wide-band effect and also an additional improvement in the high-frequency range.

A further preferred variant is that of combination with a Helmholz resonator. This variant can be realized by disposing a Helmholz resonator, matched to the sound frequency of the sound waves to be deadened, between the two pipe resonators. Here, again, it is possible to achieve sound reduction over a wide-band frequency range through appropriate dimensioning.

In order to reduce the pressure losses, the pipe resonators are preferably disposed in parallel, within a common chamber. For this purpose, the chamber has a dividing wall, built into which are one or more pipe sections, connected in parallel, with cover caps disposed above them.

The invention is explained in greater detail below with reference to embodiment examples and drawings, in which.

Figure 1:
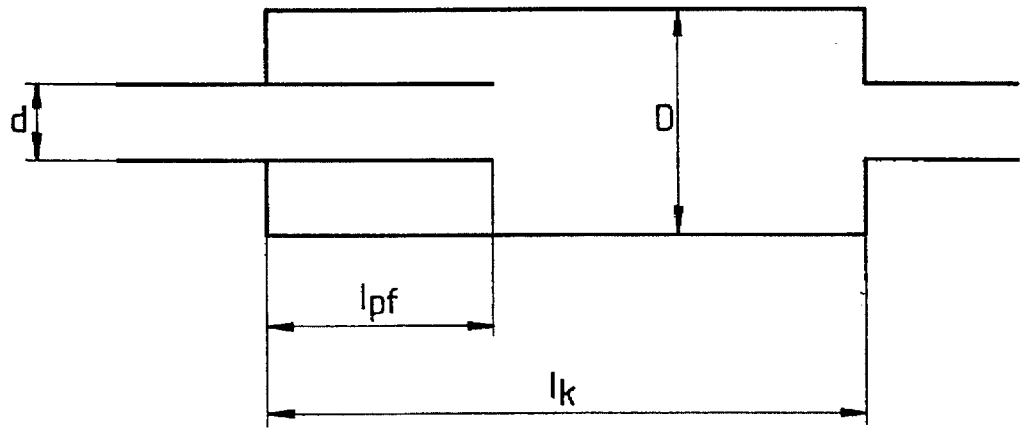
FIG. 1 shows a pipe resonator of conventional construction.
Figure 2:
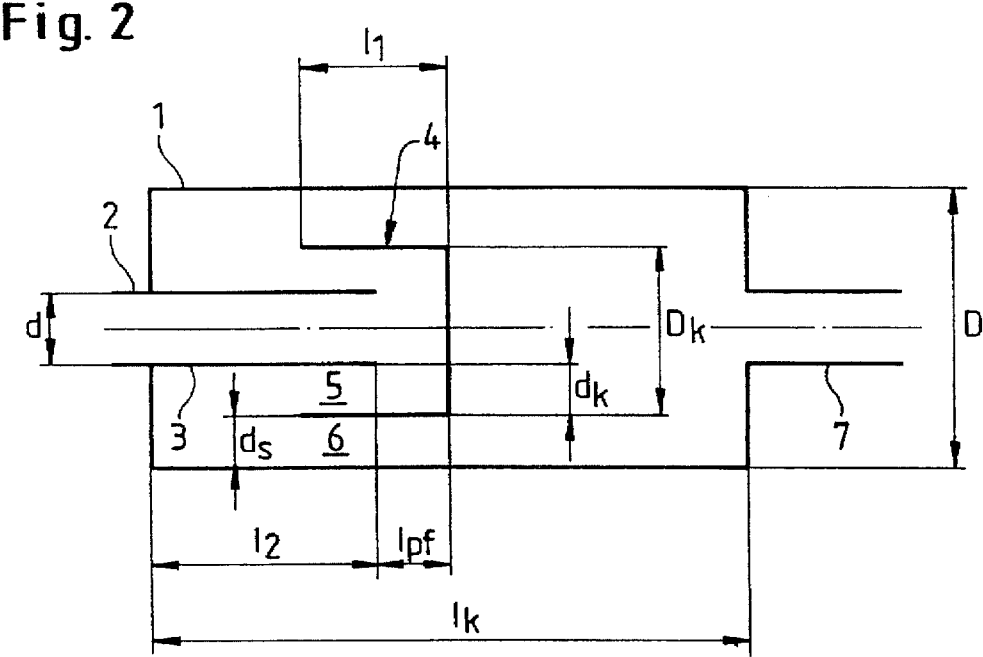
FIG. 2 shows the arrangement of the sound damper in a closed pipeline.

As shown by FIG. 2, the sound damper, in its simplest design, consists of a chamber 1 to which the pipeline 2 is connected through a pipe section 3 projecting into the chamber 1. A cover cap 4, having the diameter $D_k$ and the length $l_1$, is fitted at the distance $l_{pf}$ from the opening of the inwardly projecting pipe section 3. In order to reduce the pressure losses, this cap 4 is preferably made wholly or partially from perforated plate in which the proportion of hole surface area is <40%. The distance $l_{pf}$, the length of the cover cap $l_1$ and the length of the pipe section $l_2$, as well as the diameter D of the chamber 1 are determined according to known criteria so as to achieve a good sound-damping effect, taking into account the fact that the system overall is designed for favourable flow characteristics. The annular channel 5 having the inside width $d_k$ between the circumferential surface of the cap 4 and the outer surface of the pipe section 3 projecting into the chamber 1 is dimensioned, with regard to the required upper limiting frequency $f_{og}$ (=highest frequency occurring in the sound spectrum that is to be deadened), according to the following formula:

$$D_k = d + 2*(c/(2*f_{og})),$$

wherein c denotes the sound velocity in the pipeline. Furthermore, the annular gap 6 (gap width $d_s$) between the cap 4 and the chamber 1 is dimensioned so that it acts as an interference damper. This achieved by making the length $l_1$ of the cover cap such that it accords with the equation $l_1 = c/(4*f_r)$, where c is the sound velocity and $f_r$ is the given sound frequency of the sound waves that are to be deadened.

Figure 3:
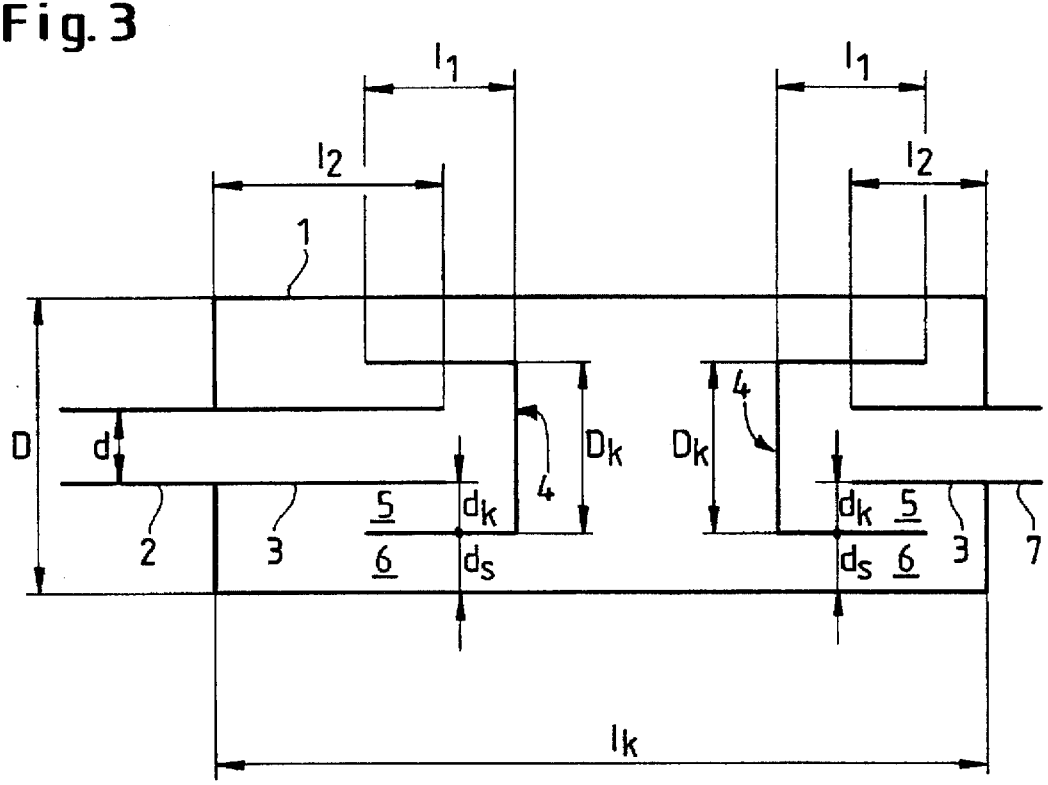
FIG. 3 shows a series connection of 2 sound dampers in one chamber.

FIG. 3 shows the series connection of two sound damper systems, each consisting of a pipe section 3 and a cover cap 4 in a common chamber 1. Depending on the application, the dimensions of these two sound damper systems can be the same as or different from those of the embodiment described above (FIG. 2).

Figure 4:
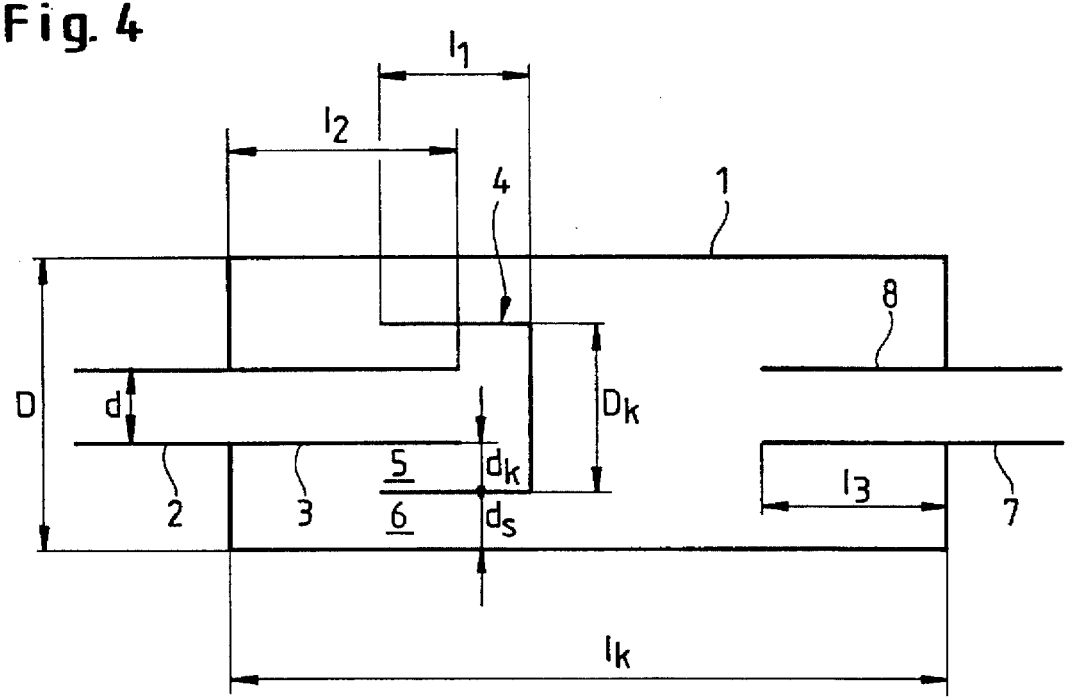
FIGS. 4 and 5 show different combination possibilities with a conventional pipe resonator.

According to FIG. 4, on the one hand, the pipe section 3 projecting into the chamber 1 is equipped with a cap 4, while on the other hand, the pipe section 8 attached to the continued section 7 of the pipeline projects into the chamber 1, so that a conventional pipe resonator is formed in combination with the preceding sound damper. The length $l_3$ of the pipe section 8 is appropriately selected so as to determine the additional resonance frequencies of the conventional pipe resonator for which sound deadening is to be effected.

Figure 5:
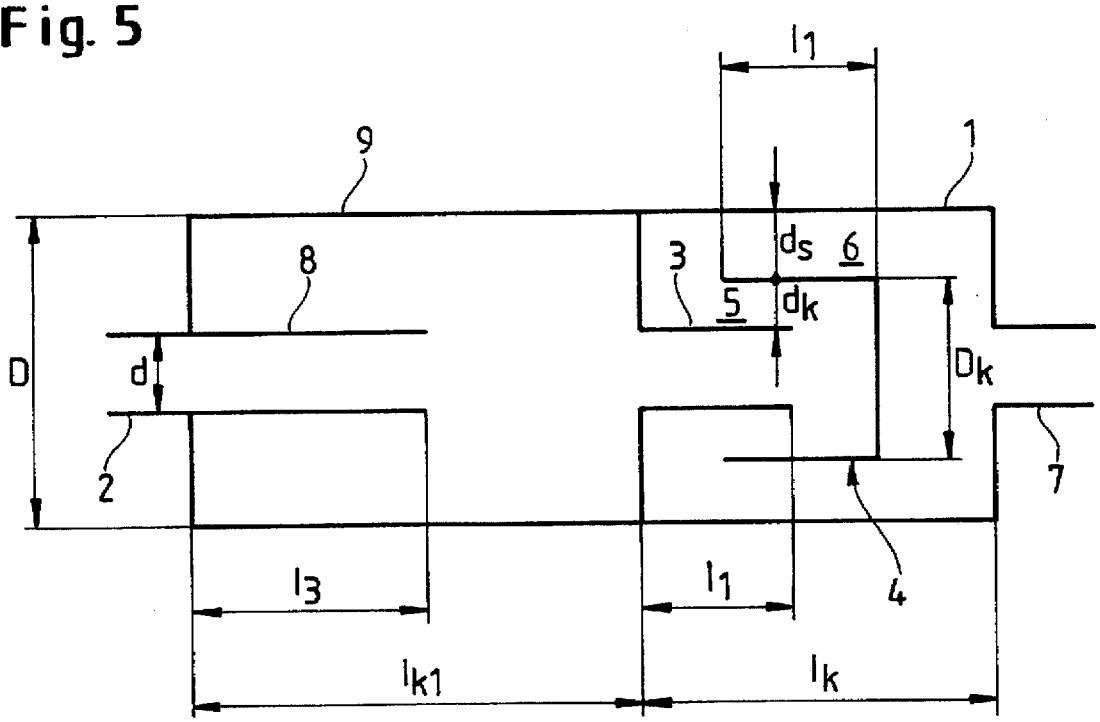

FIG. 5 also shows a conventional pipe resonator with a pipe section 8 which projects into the pipe resonator chamber 9. The pipe resonator chamber 9 is directly connected to the chamber 1. The pipe section 3 projecting into the chamber 1 is again equipped with a cover cap 4 and dimensioned as described above. The length $l_3$ of the pipe section 8 is used to determine additional resonance frequencies for which sound damping is to be effected.

Figure 6:
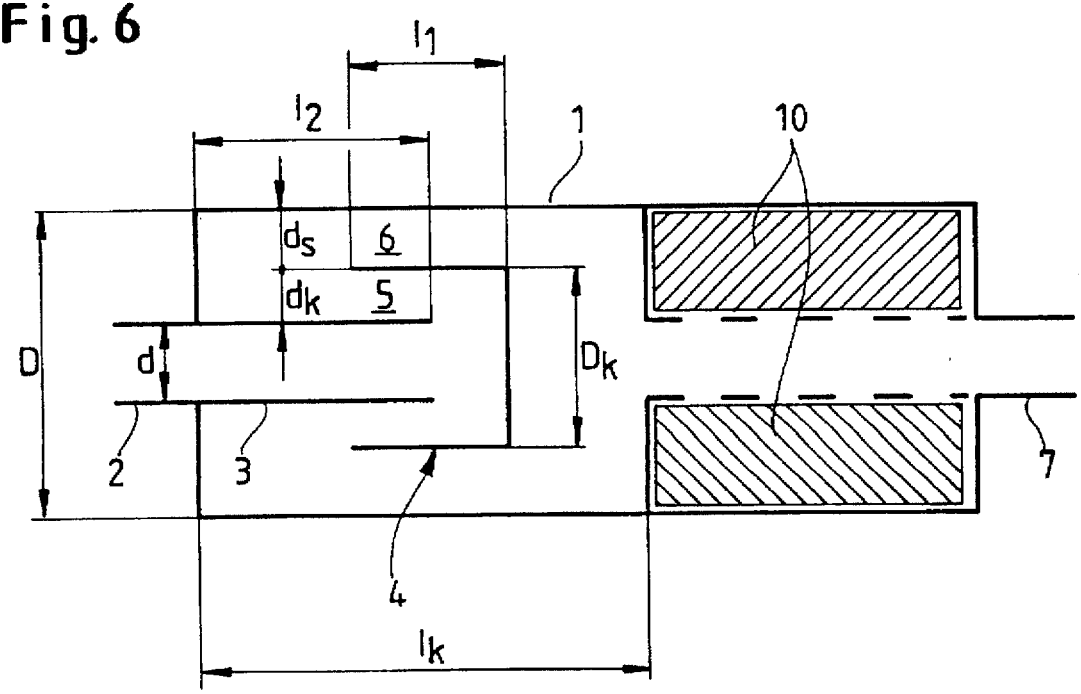
FIGS. 6 and 7 show preferred designs of the sound damper, in combination with an absorption sound damper.

FIG. 6 shows a possible combination of the sound damper system, consisting of the pipe section 3 and the cover cap 4, with an absorption sound damper 10 which adjoins the chamber outlet in a known manner.

Figure 7:
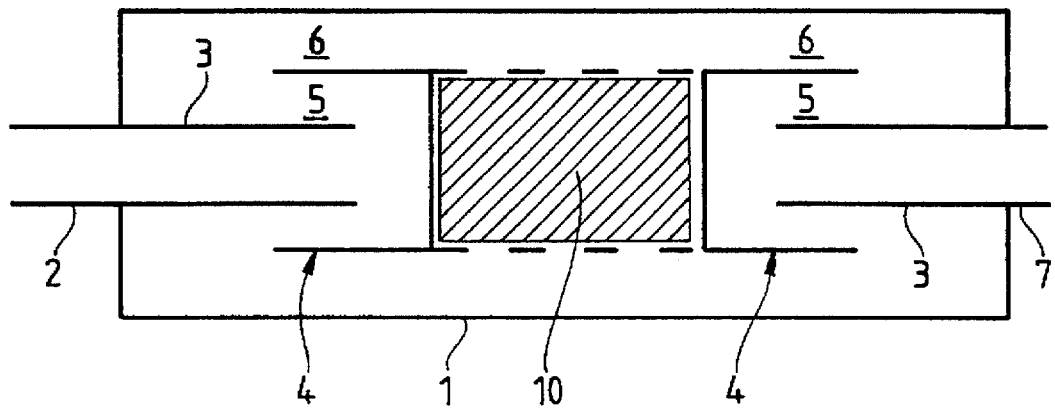

According to FIG. 7, the absorption sound damper 10 is disposed in the chamber 1 between the cover caps 4 of two successive resonance sound dampers.

Figure 8:
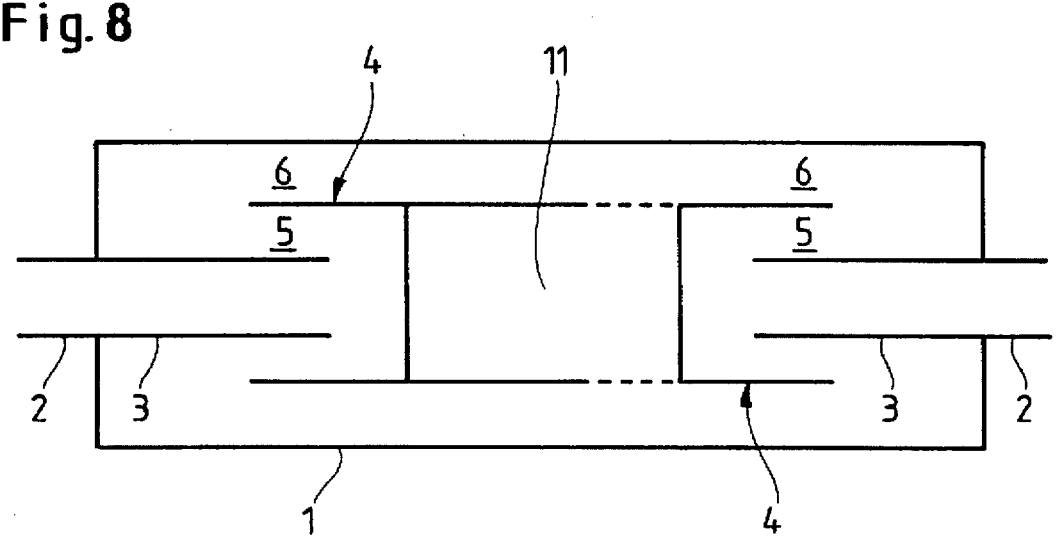
FIG. 8 shows a combination of series-connected sound dampers and a Helmholz pipe.

FIG. 8 shows a particularly effective combination of the sound damper according to the invention and a Helmholz resonator. Here, the Helmholz resonator 11 is disposed between the two cover caps 4. A design which differs from conventional Helmholz resonators has been described in DE 42 10 786. This structural form has also proved to be particularly effective in this case.

Figure 9:
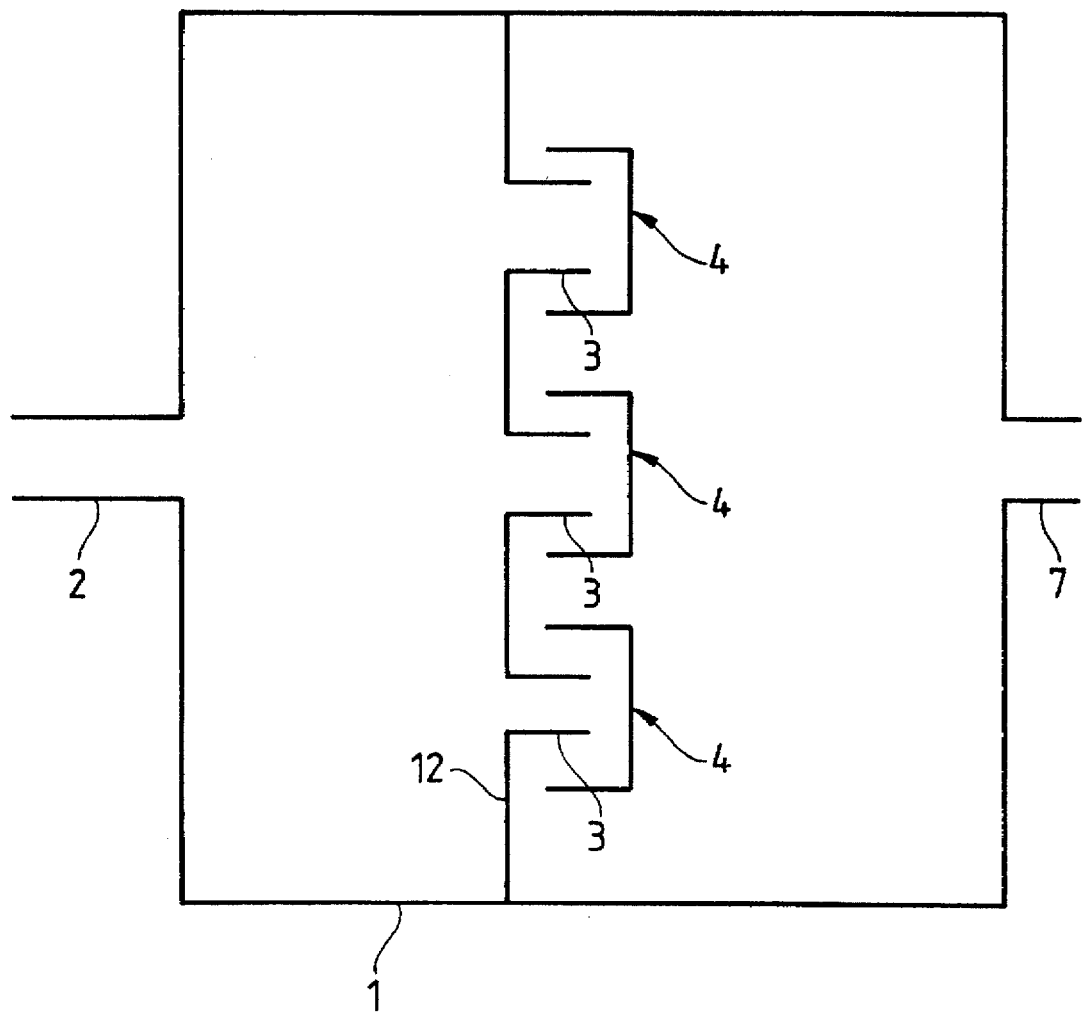
FIG. 9 shows a parallel arrangement of sound dampers in the chamber.

A further embodiment of the invention is depicted in FIG. 9. Here, the chamber 1 has a separating wall 12, built into which are several pipe sections 3, connected in parallel, over which are disposed cover caps 4. This variant has the advantage that the free flow cross section can be dimensioned as required in order to reduce the flow rate and thereby reduce the pressure losses.

The embodiment examples described above relate to round pipelines and chambers. It is evident, however, that the sound reduction according to the invention can also be applied at least to shaft-shaped pipelines with a square or almost square cross section. In this case, the diameter is replaced by the shaft dimensions and the greatest. transverse dimension of the chamber built into the sound-conducting shaft.

We claim:

1. A device for deadening sound in pipelines wherein the sound to be deadened has an upper limiting frequency $f_{og}$ comprising a chamber (1) having a chamber inlet, a chamber outlet and an inner wall, said chamber being positioned on the pipeline, wherein a discontinuous pipeline section (3) having an open end and a diameter d projects into the chamber (1) at the chamber inlet and a discontinuous pipeline section (7) connected to the chamber at the chamber outlet projecting out of the chamber; a cover cap (4) disposed within the chamber (1) opposite the opening of the pipeline section (3), said cover cap (4) having side walls of a length $l_1$, and an end wall connected to the side walls and a diameter $D_k$ and being in the form of a pipe resonator, the side walls of said cover cap (4) enclosing the pipeline section (3) concentrically to form an annular channel (5) between said side walls and said pipeline section (3) with an inside width $d_k$ while an open space $l_{pf}$ is maintained between the opening of the pipeline (3) and the end wall of said cover cap (4), wherein the diameters $D_k$ of the cover cap (4) and d of the pipeline section (3), the inside width $d_k$ of the annular channel (5) and the distance $l_{pf}$ between the opening of the pipeline section (3) and the cover cap (4)

being dimensioned in dependence on the upper limiting frequency $f_{og}$ of the sound levels that are to be deadened, so as to simultaneously fulfill the equations $$d_k \leq d, \; d_k \leq l_{pf}, \; l_{pf} \leq d \qquad \text{a)}$$

$$D_k = d + 2 * d_k / (2 * f_{og}). \qquad \text{b)}$$

2. A device according to claim 1, further comprising an annular gap (6) between the cover cap (4) and the inner wall of the chamber (1), having an inside width $d_s$, said width $d_s$ being equivalent to the inside width $d_k$ of the annular channel (5) between the cover cap (4) and the pipeline section (3).

3. A device according to claim 1, further comprising an annular gap (6) between the cover cap (4) and the inner wall of the chamber (1), said annular gap (6) being formed as an interference damper for a given sound frequency and dimensioned with respect to the length $l_1$ of said side walls of the cover cap (4) so as to fulfill the equation $l_1 = c/(4*f_f)$, c being the sound velocity and $f_f$ being the given sound frequency of the sound waves that are to be deadened.

4. A device according to claim 3, wherein the length $l_1$ of the annular gap (6) is double the distance $l_{pf}$ between the opening of the pipeline section (3) and the cover cap (4).

5. A device according to claim 1, wherein the walls of the cover cap (4) consist of perforated plates.

6. Resonator according to claim 1, wherein the outlet opening is also connected to a pipeline section (3) projecting into the chamber (1).

7. A device according to claim 6, wherein disposed opposite the opening of the pipeline section (3) at the chamber outlet there is positioned a further pipe resonator, consisting of a cover cap (4), dimensioned to simultaneously fulfill equations a) and b), so that the chamber (1) has two successive pipe resonators connected in series.

8. A device according to claim 7, wherein, for the purpose of providing additional damping, a Helmholz resonator (11), matched to the sound frequency of the sound waves to be deadened, is disposed between the two pipe resonators.

9. A device according to claim 1, wherein the chamber (1) also has an absorption sound damper (10).

10. Device according to claims 7, wherein the absorption sound damper (10) is disposed between the cover caps (4) within the chamber (1).

11. A device according to claim 1, wherein the chamber (1) has a dividing wall (12), built into which are one or more pipe sections (3), having an open end connected in parallel, with cover caps (4) disposed opposite the opening of pipe sections (3).

* * * * *

UNITED STATES PATENT AND TRADEMARK OFFICE
CERTIFICATE OF CORRECTION

PATENT NO. : 5,677,518
DATED : October 14, 1997
INVENTOR(S) : Fischer, et al.

It is certified that error appears in the above-indentified patent and that said Letters Patent is hereby corrected as shown below:

Title page, item [56]: U.S. PATENT DOCUMENTS: Delete " 1,665,005" and substitute -- 1,666,005 -- and after " 2,043,030 " delete " 4/1936 " and substitute -- 6/1936 --

Col. 6, line 17  Delete " Device " and substitute -- A device --

Signed and Sealed this

Third Day of November, 1998

Attest:

BRUCE LEHMAN

Attesting Officer

Commissioner of Patents and Trademarks